F. L. DYER.
MOTION PICTURE PROJECTING MACHINE.
APPLICATION FILED AUG. 25, 1914.
1,235,776.
Patented Aug. 7, 1917.
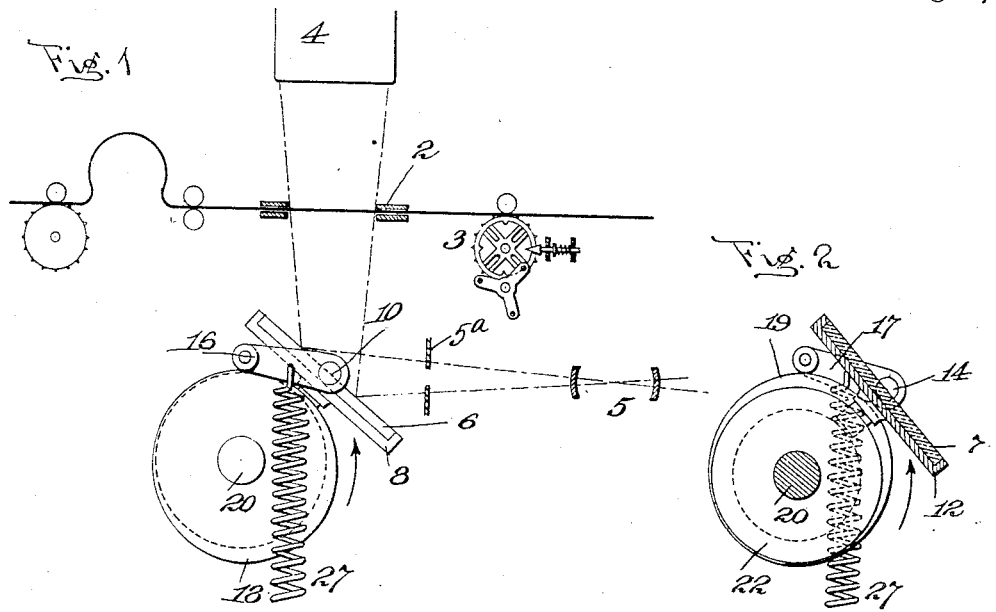
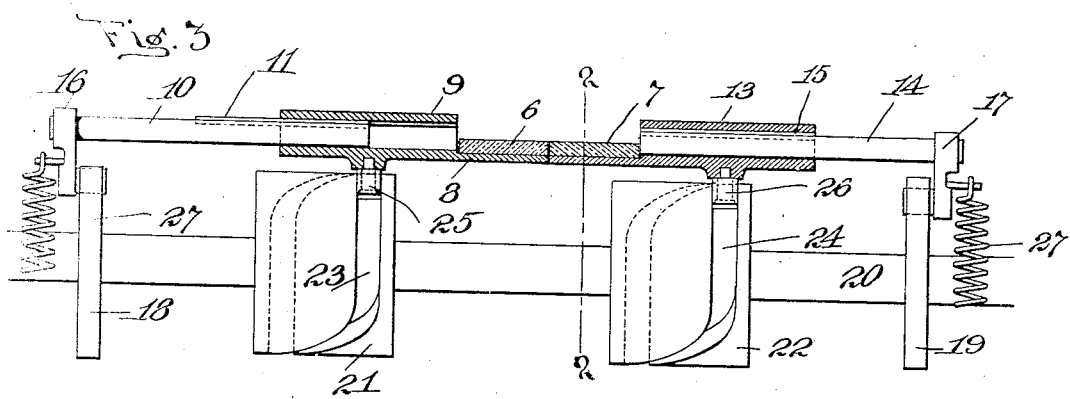
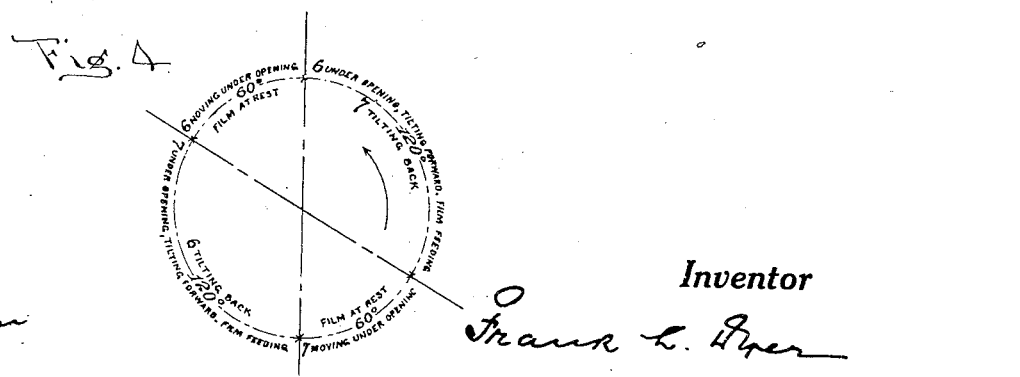
Witnesses:
J. F. Coleman
Albin Anderson
Inventor
Frank L. Dyer

UNITED STATES PATENT OFFICE.

FRANK L. DYER, OF MONTCLAIR, NEW JERSEY.

MOTION-PICTURE-PROJECTING MACHINE.

1,235,776.

Specification of Letters Patent.

Patented Aug. 7, 1917.

Application filed August 25, 1914. Serial No. 858,426.

*To all whom it may concern:*

Be it known that I, FRANK L. DYER, a citizen of the United States, and a resident of Montclair, county of Essex, State of New Jersey, have invented a certain new and useful Improvement in Motion-Picture-Projecting Machines, of which the following is a specification.

My invention relates to motion picture projecting machines of the type described in my application for patent filed June 11, 1914, Serial No. 844,431, wherein is used an intermittently moving film and a plurality of reflecting surfaces, arranged and operated so as to provide for a constant illumination of the image and thereby do away with objectionable flicker. With the specific machine shown in that application, I made use of a single tilting mirror arranged to change its angle to follow the movement of the film, and a second mirror arranged to intercept the light beam during the periods of rest of the film, to thereby permit the first mirror to return to its initial position. With such a device I made use of two projecting lenses, in order to do away with the necessity of reflecting the image more than once, and thus preserving sharpness of definition as much as possible.

The object of my present invention is to provide a device of this general type, wherein only a single reflection is used and only a single projecting lens is necessary.

To this end, the invention comprises an intermittent feeding device for intermittently moving the film with respect to the light beam, a single objective for receiving and projecting the light beam upon the screen, and a system of reflectors arranged to successively coact with the light beam and whose angles are changed to compensate for the movement of the film, while during the periods of rest the angle is held stationary to hold the image stationary on the screen. As an embodiment of the invention I utilize two reflectors arranged between the film and objective, and mounted so as to tilt and at the same time move back and forth into and out of the light beam and located very close together. During the period of movement of the film, one of the reflectors receiving the light beam from the film will reflect it to the objective, and at the same time will tilt so as to hold the image stationary. Then when the film comes to rest, the tilting of the mirror will stop and during this stationary period the two reflectors will shift laterally so as to produce a dissolving effect, since the second reflector will be in its initial position and will commence to reflect the succeeding picture. The film in starting its next feed movement will be accompanied by the tilting of the second reflector to hold the image stationary, and during this movement the first reflector will return to its initial position, so that when the film again comes to rest, the lateral shifting of the two reflectors will cause another dissolving effect to take place, and the next picture will therefore be reflected by the first reflector and so on. Each reflector reflects every other picture, and since the image will be reflected at all times there will be no flicker, no matter how slow the machine may be operated. Preferably, as pointed out in my said application, I arrange the feed movements so that they will be longer than the periods of rest, in order to secure minimum vibration and permit the reflectors to follow the movements of the film under conditions of maximum accuracy.

In order that the invention may be better understood, attention is directed to the accompanying drawings, forming part of this specification and in which:

Figure 1 is a sectional view showing the film, the intermittent feed, the objective and one of the tilting reflectors with its cam and lateral feed, the tilting reflector being shown in its initial position, ready for the film to move.

Fig. 2, a section on the line 2—2 of Fig. 3 showing the tilting reflector in its extreme position after the feed movement of the film has ended.

Fig. 3, a front view partly in section showing the two reflectors, and the devices for tilting and laterally reciprocating the same; and Fig. 4, a diagram illustrating the sequence of operation of the two reflectors.

In the above views, corresponding parts are represented by the same reference numerals.

1, is the film passing between the usual film gate 2, and 3 is the mechanism, of any suitable type, for feeding the film intermittently. Preferably the feed movements are twice as long or at least longer than the periods of rest, and preferably the feed movement commences very gradually, then accelerates to maximum and gradually decreases to rest, as will be obvious to those skilled in the art.

4, is the source of light, of any suitable character and 5, the usual objective. Any suitable device for properly framing the picture may be employed, such, for example, as the screen 5ª interposed in the light beam and having an aperture equal to a single picture. 6 and 7 are two plane reflectors, mounted side by side, very close together, and arranged to successively intercept the light beam from the film and reflect the same to the objective. The reflector 6 is carried by a support 8, which is provided with a sleeve 9 mounted on a rock shaft 10 so as to slide thereon. A key 11 causes the sleeve 9 and reflector 6 to rock with the rock shaft 10. The reflector 7 is supported in the same way, on a support 12, carried by a sleeve 13, which is mounted on a rock shaft and caused to rock therewith by means of the key 15. The center of the two rock shafts 10 and 14 is in line with the surface of the reflectors 6 and 7, so that as the reflectors tilt the distance between the film 1 and objective 5 will not change. The reflectors are tilted by providing the rock shafts with arms 16 and 17 which coöperate with cams 18 and 19 on the shaft 20.

In order to reciprocate the reflectors 6, 7, any suitable mechanism may be employed, but I show for this purpose two rings 21, 22 on the shaft 20, having cam grooves 23, 24 with which engage the rollers 25, 26 on the sleeves 9 and 13, respectively. Springs 27 hold the arms 16, 17 in engagement with the cams 18, 19.

In operation the cam grooves 23, 24 reciprocate the two reflectors back and forth across the light beam, so that the light beam is first reflected by one and then by the other. At the same time the two reflectors are being tilted by the cams 18, 19 which rock the shafts 10, 14. During the movement of the film, the reflector 6, for example, will be tilting to hold the image stationary. The cam grooves 23, 24 will be so formed that as soon as the picture comes to rest the two reflectors will be shifted sidewise so as to bring the reflector 7 into the beam. At this point, the reflector 6 will be stationary in its extreme position, while the reflector 7 will be stationary in its initial position. Consequently as the line between the reflectors cuts across the light beam, the reflector 6 will continue to reflect less and less of its picture until it dies away entirely, while the reflector 7 will reflect more and more of the succeeding picture until it reflects it entirely. Then the film commences to move, and the reflector 7 by tilting holds the image stationary, while the reflector 6 returns to its initial position, ready to receive the succeeding image.

Briefly stated, the operation consists in reflecting the images by a plurality of reflectors which are stationary when the film is stationary and which tilt when the film moves, and which reflectors are moved bodily so as to cut the light beam during the periods of rest. The operations can be well understood by reference to the diagram of Fig. 4 and starting at the bottom and following the sequence in the direction of the arrow. For 60° the film is at rest, and the line between the reflectors cuts the light beam to produce the dissolving effect. For the next 120° the film is feeding and the reflector, say, 6, is tilting, the beam being reflected by that reflector entirely and the other reflector 7 is moving back to its initial position. For the next 60° the film is at rest and the line between the two reflectors cuts the light beam again, the two reflectors being angularly stationary and the beam passing from reflector 6 to reflector 7. For the final 120° the film is again feeding, the reflector 7 being tilted to hold the image stationary and the reflector 6 moving back to its initial position.

Having now described my invention, what I claim as new therein and desire to secure by Letters Patent, is:

1. A moving picture projecting machine, comprising an intermittent feeding device for intermittently moving the film with respect to the light beam, a single objective for receiving and projecting the light beam upon the screen, a system of reflectors, means for causing the reflectors to successively coact with the light beam and for changing the angle of the reflectors to compensate for the movement of the film and means for holding the reflectors stationary during the periods of rest of the film, whereby the image at all times is held stationary on the screen, substantially as set forth.

2. In a moving picture projecting machine, the combination with a moving picture film, means for feeding the same intermittently, a source of light and a single objective, of a plurality of reflectors, means for moving the same to successively cut the light beam during the still position of the reflectors, means for changing the angle of the reflectors as the film occupies successive positions in the path of light to hold the reflected image stationary while the film is moving and means for holding the reflectors stationary while the film is at rest, substantially as set forth.

3. In a moving picture projecting machine, the combination with a moving picture film, means for feeding the same intermittently, a source of light and a single objective, of a plurality of reflectors, means for changing the angles of said reflectors alternately in synchronism with the film, and means for successively moving the reflectors into and out of the light beam during the still position of the reflectors, substantially as set forth.

4. In a moving picture projecting machine, the combination with a moving picture film, means for feeding the same intermittently, a source of light and a single objective, of a pair of reflectors each adapted to reflect alternate images, means for changing the angle of the reflectors as the film occupies successive positions in the path of light to compensate for the movement of the film, and means for shifting the reflectors bodily into and out of the light beam during the still position of the reflectors, substantially as set forth.

This specification signed and witnessed this 24th day of August, 1914.

FRANK L. DYER.

Witnesses:
JAS. F. COLEMAN,
MAUDE V. LORILLARD.